March 7, 1939. T. N. PIERSON 2,149,867
DELIVERY CONTROL MECHANISM FOR BINS
Filed Aug. 19, 1937
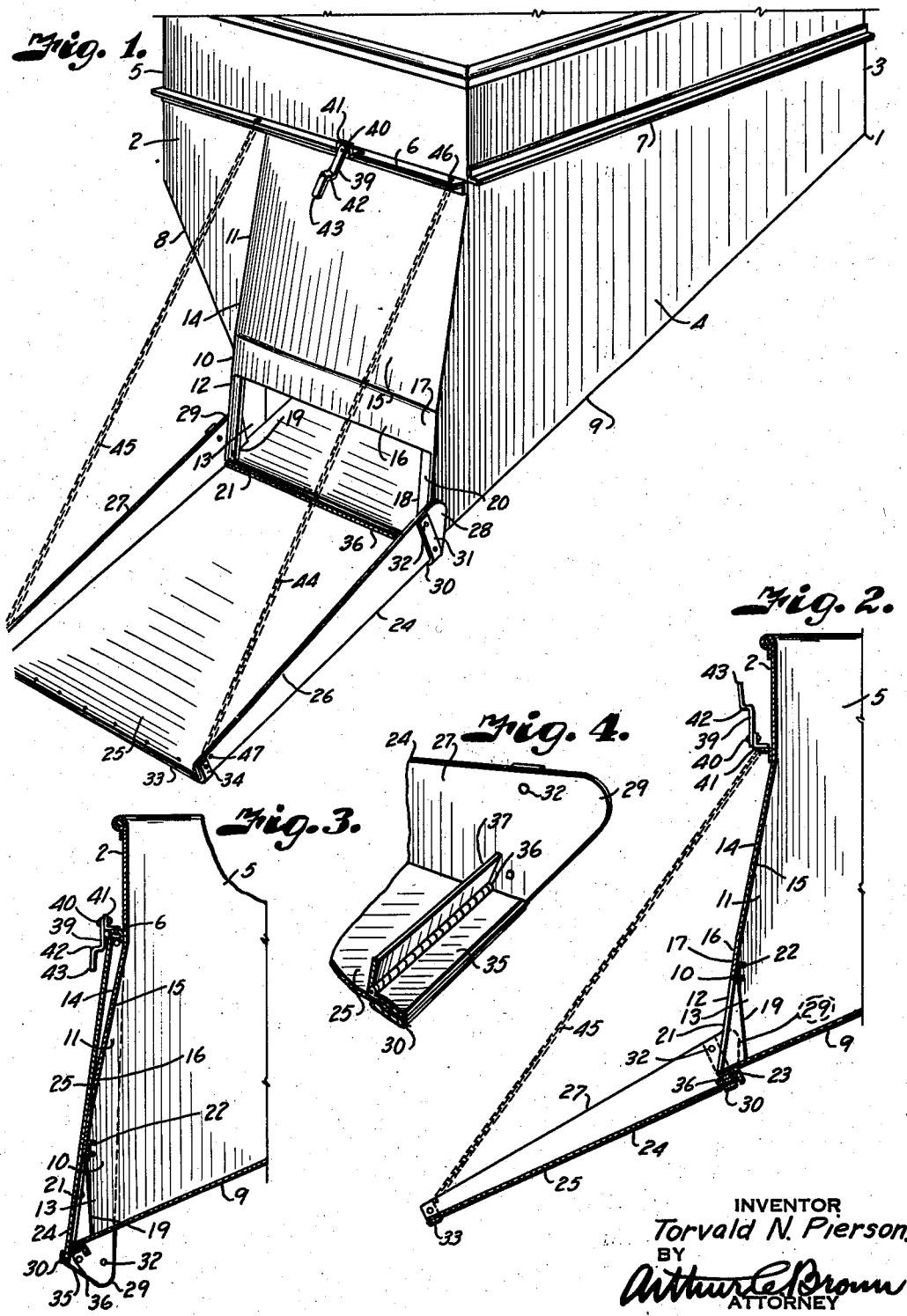
INVENTOR
Torvald N. Pierson.
BY
Arthur C. Brown
ATTORNEY Patented Mar. 7, 1939

2,149,867

UNITED STATES PATENT OFFICE 2,149,867

DELIVERY CONTROL MECHANISM FOR BINS

Torvald N. Pierson, Independence, Mo., assignor to Gleaner Harvester Corporation, Independence, Mo., a corporation of Delaware Application August 19, 1937, Serial No. 159,919

2 Claims. (Cl. 193—17)

This invention relates to a delivery control mechanism for bins, and particularly to those used on harvesting machines, and in which harvested material, such as grain, is stored preparatory for delivery to a wagon, truck, or other receptacle that is brought along the side of the machine.

It is a principal object of the present invention to provide a bin of this character with a combination delivery control and chute, so arranged that when the chute is raised over the spout outlet it automatically closes the opening to retain the grain, and when the chute is lowered to guide the grain into the receptacle, the spout outlet of the bin is opened to permit discharge of the grain.

Other important objects of the invention are to construct the chute so as to avoid spilling of the grain during movement of the chute; to provide a chute and spout construction which effectively shuts off the flow of grain and avoids loss of the grain while the harvesting machine is in operation; to provide a simple and readily operated latch for holding the chute in spout closing position; to provide a simple and effective hinge connection between the chute and spout of the bin; and to provide a strong and rigid construction capable of withstanding the wear and tear to which such chutes are subjected.

In accomplishing these and other objects of the invention, as hereinafter pointed out, I have provided improved details of structure, the preferred form of which is illustrated in the accompanying drawing, wherein:

Fig. 1 is a perspective view of a bin such as used on a combine harvester, and which is equipped with a combination delivery control and chute constructed in accordance with the present invention.

Fig. 2 is a sectional view through the spout side of the bin and chute, showing the chute in position for guiding flow of grain from the bin into a truck or similar receptacle.

Fig. 3 is a similar section showing the chute in spout closing position to retain the grain in the bin.

Fig. 4 is a detail perspective view of a portion of the chute, particularly illustrating the hinge for connecting the chute with the spout of the bin.

Referring more in detail to the drawing:

1 designates a bin such as used on harvesting, threshing and separating machines, commonly known as combines, to receive the threshed grain, and in which a quantity of grain is stored preparatory for delivery to a wagon, truck or other receptacle.

The bin 1 is composed of metal plates to provide side walls 2, 3, 4 and 5, reinforced at a point below the rim of the bin by angle members 6 and 7. The portion of the side wall 4 extending below the angle member 7 has its lower edge sloping downwardly from the wall 3 toward the wall 2, to cooperate with an inclined portion 8 of the opposite side wall to connect with an inclined bottom 9 for forming a spout 10. The lower portion of the wall extends beyond the wall 2 to cooperate with a wing extension 11 that is formed in the wall 2 in parallel spaced relation with the wall 4.

The wing 11 and projecting portion of the side wall have their outer, lower edges 12 slightly inclined in the direction of the wall 2 to a point a sufficient distance above the bottom 9 for accommodating a grain outlet 13, and their upper edges 14 inclined on a slightly greater angle to meet the plane of the wall 2 at a point below the angle 6. The edges 14 are connected by a plate 15 having a depending flange portion 16, bent to connect with the edges 12 to form a seat 17 for contact with the chute, as later described. The side edges 13 are reinforced below the flange 16 with angle shaped inserts 18 and 19 having flanges 20 and 21 located in the plane of the flange portion 16 to form seats at the side edges of the opening 13 to cooperate with the seat 17. The lower edge of the flange 16 is preferably reinforced on the inner side thereof by a channel member 22, extending transversely thereacross as shown in Figs. 2 and 3.

The bottom of the spout is also reinforced by an angle member 23 that forms a connection for the hinging mechanism of the chute 24. The chute 24 is also preferably formed of sheet material, and includes a substantially rectangular plate 25 conforming to the width of the spout, and of sufficient length to extend from the angle 6 to a point slightly overlapping the edge of the bottom 9 as clearly shown in Fig. 3. The sides of the plate are provided with side wings 26 and 27, having greater depth at the hinge end of the chute than at the free end as shown in Fig. 1. The side wings overlap the outer faces of the wing and extension of the side wall with the larger ends preferably extending beyond the rear edge of the chute, as indicated at 28 and 29, so that when the chute is in open position the wings engage the sides of the spout to prevent leakage of grain therebetween.

The hinge end of the chute is reinforced by a cross bar 30 extending thereunder and having laterally bent ends 31 overlapping the outer side of the wings. The cross bar, as well as the ends thereof, are secured to the chute by welding or fastening devices, such as rivets, 32. The opposite end of the chute is reinforced by a similar bar 33 that is secured under the lower edge thereof and has laterally bent ends 34 fixed to the narrow ends of the wings.

Fixed to the upper face of the plate portion of the chute is the leaf 35 of a hinge member 36, having its other leaf 37 fixed to the flange of the angle 23 as shown in Fig. 2, the hinge being located in such a position that when the chute is closed the plate portion 25 thereof engages the seats 17, 20 and 21, to seal the opening 13 and prevent flow of grain from the bin.

The chute is retained in closed position by a latch 39 that is pivoted, as at 40, on an angle shaped clip 41 carried by the angle bar 6. The free end of the latch is offset, as at 42, to provide a handle 43, whereby the latch may be swung to and from engagement with the chute. The chute is suspended in operative position by flexible connections, such as chains, 44 and 45, having their upper ends secured to the angle member 6 by fastening devices 46, and their lower ends secured to the side wings at the terminal end of the chute by similar fastening devices 47, the chains being of sufficient length to support the chute in substantially parallel relation with the bottom 9 of the spout.

In using a grain bin equipped wih a chute and control mechanism constructed as described, and assuming the bin as being mounted upon the combine, the chute is normally moved so that the plate portion thereof covers the outlet opening and engages against the seating faces 17, 20 and 21. The latch is then moved so that it engages over the free end of the chute, as shown in Fig. 3, supporting the chute in latched condition. Grain from the separator is then discharged into the bin as in conventional manner, until the bin is filled. A truck or similar receptacle may be drawn alongside the combine, whereupon the latch is released to permit the chute to drop into position for allowing discharge from the spout opening. The grain then flows by gravity down the spout, across the chute, and into the truck.

From the foregoing it is obvious that I have provided a combination chute and control device which is readily operative, and which effectively retains the grain from spilling, both while the chute is in closed position and while the chute is being moved to discharge the grain.

What I claim and desire to secure by Letters Patent is:

1. In a bin for combine harvesters and the like including side walls, an inclined bottom sloping in the direction of an opening in one of the side walls, a spout covering the opening having spaced sides and a bottom formed as a continuation of said bin bottom, a cover closing the upper portion of the spout and having an upper portion sloping toward the bin at a greater angle than the lower portion, said lower portion cooperating to form an outlet for said spout, a chute having a bottom extending across the width of the spout and having side wings respectively overlapping said sides, means hinging the chute with respect to the spout whereby the chute is moved from a delivery position to a position where the chute bottom closes said outlet opening of the spout and the side wings overlap the sides of the spout, and a clamp on the bin arranged to engage the bottom of the chute when in closed position to urge said chute bottom in the direction of said upper portion of said cover to bind the chute bottom over said outlet opening of the spout.

2. In a bin for combine harvesters, an outlet spout for the lower portion of the bin including sides connected with the bin, a sloping bottom connected by said sides, a cover connecting the sides and cooperating with said bottom to form an outlet for said spout, said cover having an upper portion sloping toward the bin at a greater angle than the plane of said outlet, a chute having a bottom extending across the width of the spout and having side wings respectively overlapping the sides of said spout, means hinging the chute with respect to the spout whereby the chute is move from a delivery position to a position where the chute bottom closes said outlet opening of the spout and the side wings overlap the sides of the spout, and a clamp on the bin arranged to engage the bottom of the chute when in closed position to urge said chute bottom in the direction of said upper portion of said cover to bind the chute bottom over said outlet opening of the spout.

TORVALD N. PIERSON.